Oct. 7, 1969 B. GOLD ET AL 3,471,644

VOICE VOCODING AND TRANSMITTING SYSTEM

Filed May 2, 1966 5 Sheets-Sheet 1

INVENTORS
BERNARD GOLD
JOSEPH TIERNEY
BY, Robert T. Dunn
ATTORNEY

INVENTORS
BERNARD GOLD
JOSEPH TIERNEY
BY, Robert T. Dunn
ATTORNEY

VOICE VOCODING AND TRANSMITTING SYSTEM

INVENTORS
BERNARD GOLD
JOSEPH TIERNEY
BY, Robert T. Dunn
ATTORNEY

INVENTORS
BERNARD GOLD
JOSEPH TIERNEY
BY, Robert T. Dunn
ATTORNEY

INVENTORS
BERNARD GOLD
JOSEPH TIERNEY
BY, Robert T. Dunn
ATTORNEY 3,471,644
VOICE VOCODING AND TRANSMITTING SYSTEM Bernard Gold, Concord, and Joseph Tierney, Cambridge, Mass., assignors to Massachusetts Institute of Technology, Cambridge, Mass., a corporation of Massachusetts
Filed May 2, 1966, Ser. No. 546,942
Int. Cl. H04b *1/66*
U.S. Cl. 179—15.55 15 Claims

ABSTRACT OF THE DISCLOSURE

Methods and means are provided for sampling a predetermined frequency band in such a manner that upon recombination the samples reproduce the band. The band is sampled at first and second regularly spaced sets of intervals, the sets of intervals defining rates, both of which are equal to the sample frequency band and the frequency band is centered at a frequency equal to that rate. The samples are combined to reproduce the frequency band.

This invention relates to voice coding and transmitting systems, and more particularly to a voice excited vocoder system by which selective parts of the spectrum of a voice message are encoded, transmitted and decoded to reconstruct the voice message in audio form.

The present invention relates generally to speech processing systems which transmit a portion of the base frequency band of speech to serve as the excitation of a synthesizer system which reconstructs the speech in audio form so that it can be understood by an operator. The synthesizer is excited by the base band signal because the base band includes the speech pitch or several harmonics of the pitch, and it is upon this pitch signal that the speech must be reconstructed in order to yield intelligible audio which can be understood by an operator. The present invention is a system for encoding the magnitude of the base band and selected upper frequency bands of the input speech, and transmitting the encoded information to a receiver location as binary digital words. At the receiver location, the encoded transmitted words are reconstructed in analog form and analog reconstructions of the upper bands are employed to modulate the analog reconstruction of the base band signal. The combined modulations of the base band signal are then added and the resultant applied to an audio circuit which controls a speaker, or to a recording device for recording the reconstructed speech.

In order to insure transmission of either the fundamental pitch frequency or two adjacent harmonics of the pitch frequency in the base band of a range of human voice types, the base band filter must extend from 300 to 900 c.p.s. Furthermore, encoding quantization must be at least 5 bits in order to provide undegraded reproduction of the 50- to 60-db dynamic range required for intelligible reproduction of the speech. For a straightforward low pass sampling of the base band, the sampling rate must be twice the highest frequency. Thus, for the base band 300- to 900-c.p.s., the sampling rate must be 1800-c.p.s. and at 6 bits per sample, the transmission rate must be 10,800 bits per second or more. It is one of the objects of the present invention to provide a system whereby the required bit rate for transmitting the base band information may be reduced.

It is another object of the present invention to provide a system for quantizing the base band and other bands of input speech into binary form for transmission at a lower transmission bit rate than done heretofore, without substantially degrading the quality of the reconstructive speech.

It is another object of the present invention to provide an improved voice encoding (vocoder) system which is particularly useful with the carbon button transducer, such as used on telephone lines.

In accordance with the present invention, the speech pattern picked up, for example, from a carbon button microphone, is fed to a base band filter which is W c.p.s. wide and centered at W c.p.s. The filtered signal is then sampled by two pulse trains which are at the same rate and in quadrature phase with respect to each other. Upon adding the two sample spectrums, the odd harmonics produced by the mixing of sampling rate with base band filter output conveniently fall beyond the base band range and the even harmonics cancel. Thus, the base band (W c.p.s. wide) of the input speech pattern is maintained entirely intact and none of the mixing harmonics produced by the sampling of the base band are quantized and transmitted to a receiver. This feature of the invention permits sampling rate to be limited to 2W and with 6 bit logarithmic quantization, the base band bit transmission rate is limited to 7200 bits per second. This technique makes possible the limitation of the total transmitter bit rate to 9600 bits per second for ordinary telephone speech, with 2400 bits per second of this total being reserved for transmitting quantized information concerning the upper frequency bands of the speech pattern.

In accordance with the specific embodiment of the present invention, the speech pattern of a carbon button microphone or its equivalent is simultaneously fed to a number of upper band adjacent frequency filters, which preferably overlap slightly in frequency and define upper band channels. The outputs of these filters are each detected and quantized into a 4-bit magnitude number or word as dictated by signals from a clock. The speech pattern is also fed to the base band filter which is 600-c.p.s. wide, centered at 600-c.p.s., with −34 db attenuation at 300- and 900-c.p.s., and is substantially flat (within 1¼ db between 320- and 850-c.p.s.). The output of this base band filter is sampled by each of two pulse trains, both of which are at 600-c.p.s. and are in phase quadrature relative to each other. The sampled trains are then combined and quantized producing a 6-bit number or word, the 6th bit representing the sign of the number. The quantized samples are then transmitted at the same rate at which they are produced, as well as each of the quantized values from each of the upper band channels, such that the quantized output from one of the upper band channels is transmitted along with each sample of the base band filter. Accordingly, the rate of sampling the outputs from each of the upper band channels is a fraction of the rate of sampling of the output from the base band filter, and this fraction depends upon the number of upper band channels. In the embodiment of the invention described herein, there are ten such upper band channels and they are sampled in a prescribed order, which is preferably from lowest to highest in frequency.

At the receiver location, in the preferred embodiment, the quantized base band magnitude is separated from the quantized upper band channel magnitude, and each quantized value is converted into its analog value, as dictated by signals from a clock which is synchronized by the clock at the transmitter location. The analog value thus obtained, which represents the output from the base band filter is distorted and fed to each of a number of channels equal in number to the number of upper band channels at the transmitter location. These channels are tuned to the same frequencies as their corresponding channels at the transmitter location and are each excited by the distorted analog reconstruction of the base band. In these channels, the distorted base band is limited, then modulated by the reconstructed analog value of each of the upper bands. The results of this modulation are combined along with the analog of the base band in an audio summing amplifier to produce the analog reconstruction of the speech pattern.

Other features and objects of the present invention will be apparent from the following specific description, taken in conjunction with the figures in which.

Figures 4, 5:
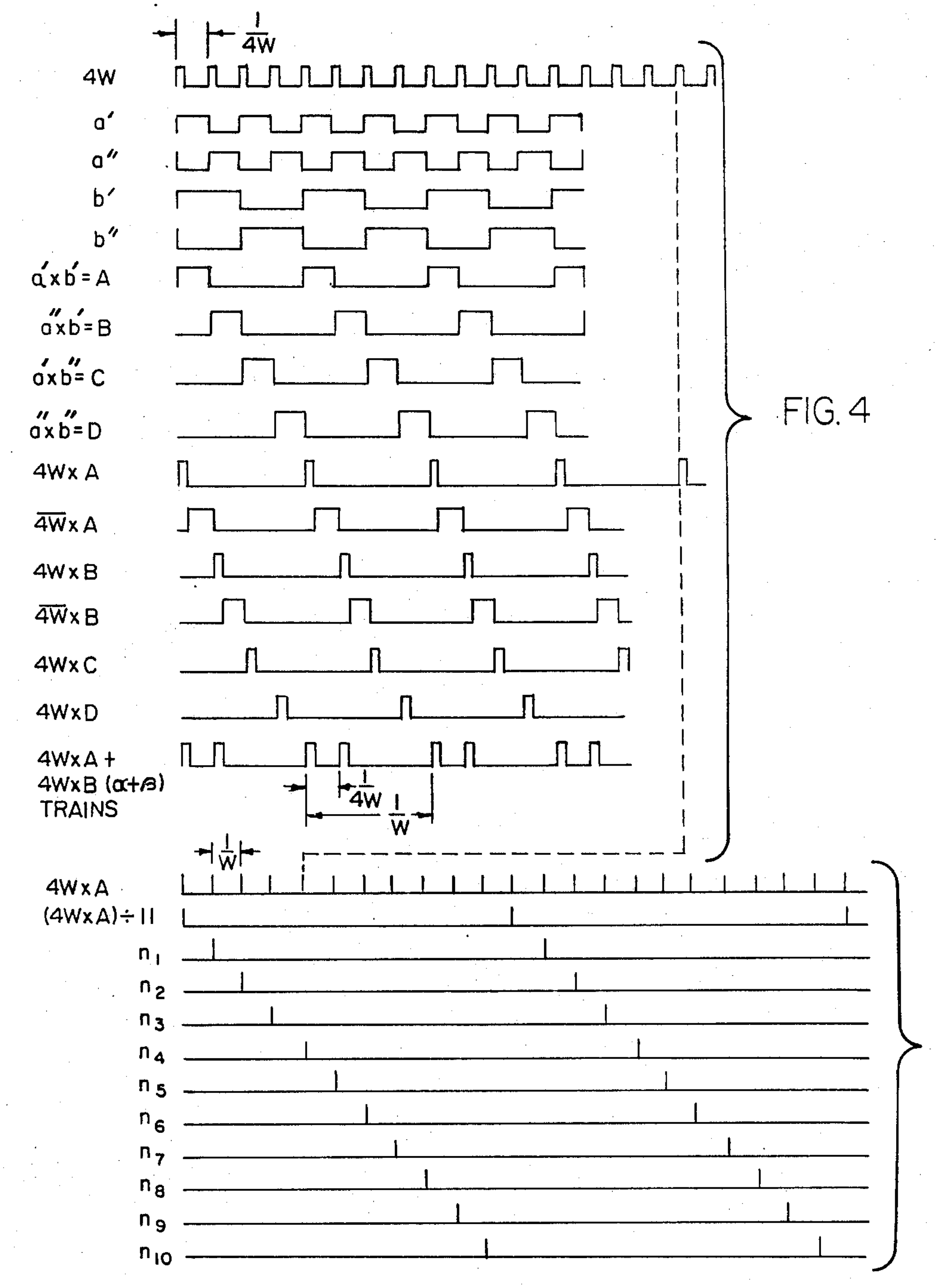
Figure 6:
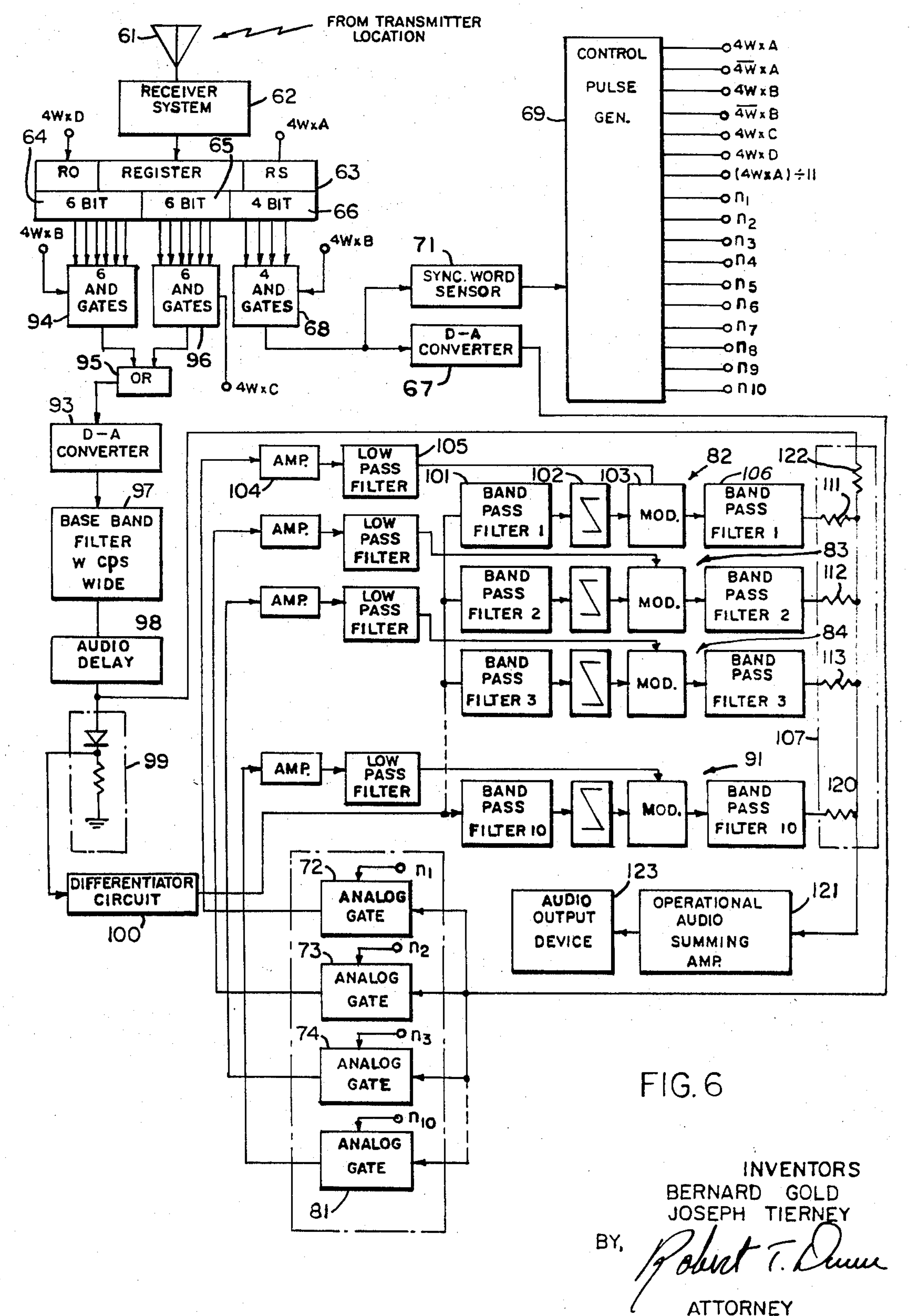

FIGURES 3*a* to 3*e* illustrate the spectra of signals produced by sampling the output of the base band filter at the transmitter location;

FIGURES 4 and 5 are waveform diagrams showing the control signals produced by the clock; and FIGURE 6 is a block diagram showing the system at the receiver location for separating the quantized values received, reconstructing analog values thereof, and combining the analog values, thereby to reconstruct the human speech.

Figure 1:
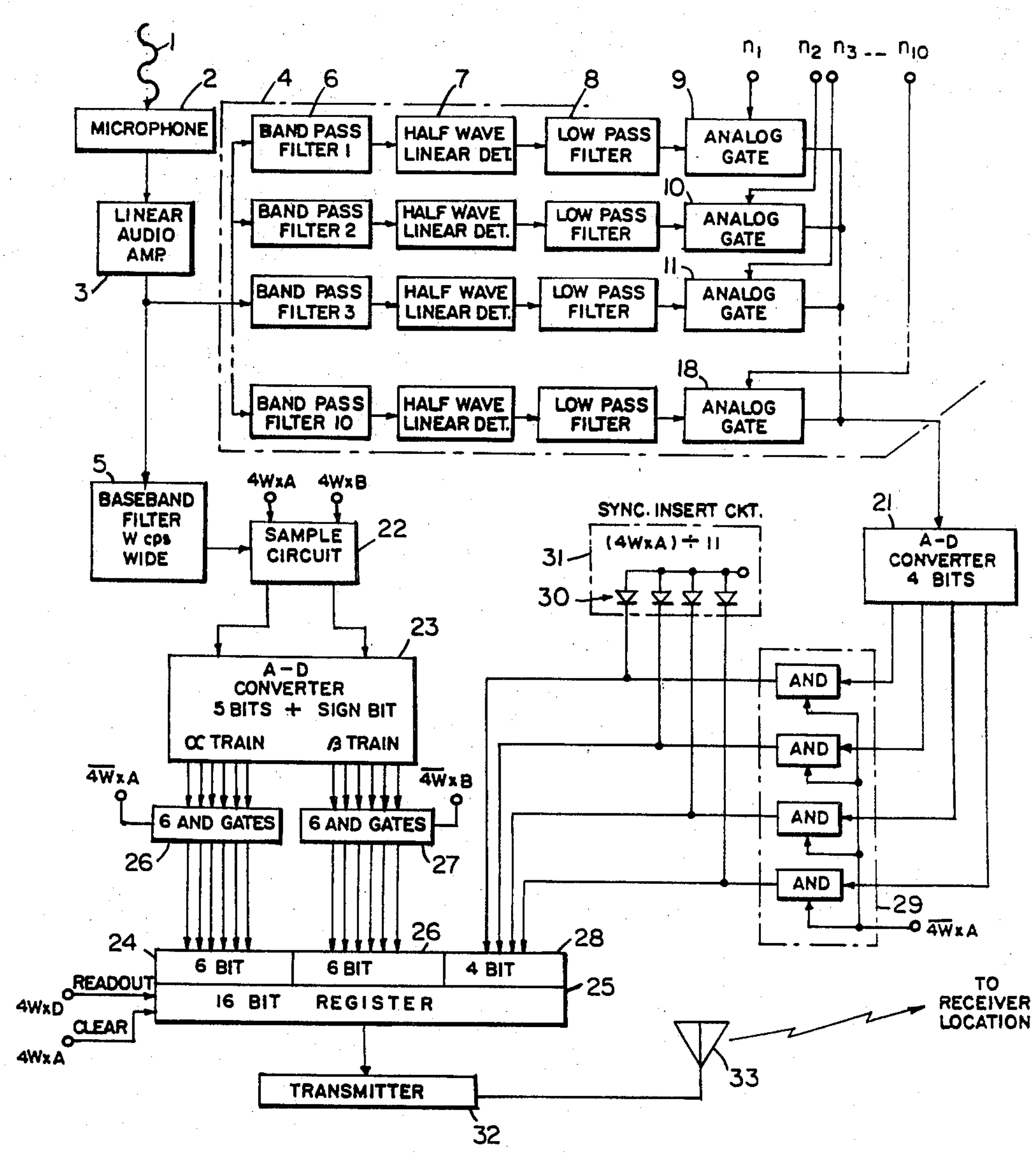
FIGURE 1 is a block diagram showing the base band and upper band channels at the transmitted location for quantizing analog speech pattern into binary numbers and for transmitting these numbers.
Figure 2:
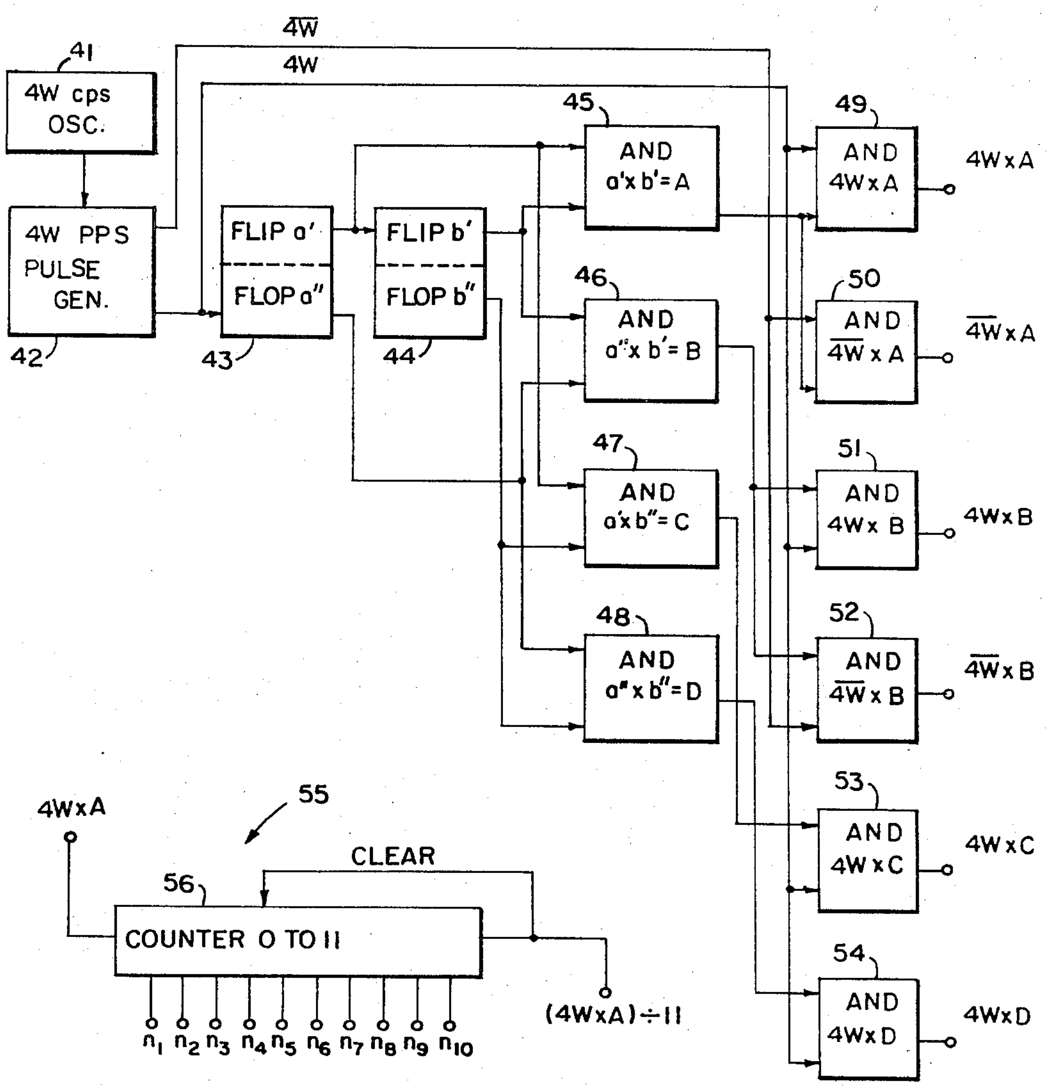
FIGURE 2 is a block diagram of the clock used at both the transmitter location and the receiver location for producing a variety of pulse trains and signals which control the sampling, quantization, and transmission rates.

Turning first to FIG. 1, there is shown in a block diagram, including the principal electrical components at the transmitter location for sampling and quantizing frequency bands of human speech. This system is controlled by signals obtained from a clock, which are generally referred to as control signals. A block diagram of the clock is shown in FIG. 2 and waveforms illustrating the control signals are shown in FIGS. 4 and 5. As shown in FIG. 1, human speech 1 incident upon a microphone 2 is converted into electrical signals which are amplified by linear audio amplifier 3. The output of amplifier 3 is fed to the bank 4 of upper band filter channels and to the base band filter 5. The base band filter 5 is designed in consideration of the spectral characteristics of the microphone 2. If this microphone is a carbon button type such as used in telephones, then it can be expected that the speech pitch frequency or at least two adjacent harmonics of the pitch will be transmitted by the microphone. More particularly, the carbon button type microphone has a lower cutoff at about 300-c.p.s. Since the human voice for a variety of subjects may range in pitch from 150- to 450-c.p.s., then it follows that either the fundamental or at least two adjacent harmonics of pitch will be present in band 300- through 900-c.p.s. and this band, it will be noted, is 600-c.p.s. wide and centered at 600-c.p.s. The base band filter 5 is designed to pass just this band. Accordingly, the base band filter is preferably designed to have −35 db attenuation at 300- and 900-c.p.s. and 1¼ db of ripple in the flat portion from 320- to 850-c.p.s.

The bank 4 of upper band filter channels includes, for example, 10 channels. These channels preferably span the range 900- to 3300-c.p.s. in equal increments. For this purpose, each of the channels 1 to 10 commences with a channel band pass filter, such as filter 6, each of which is about 240-c.p.s. wide. In fact, these filters are preferably somewhat wider than 240 c.p.s., so that the bands overlap. The channel filter in each channel is followed by a linear half-wave detector, such as detector 7, and the output of the detector is filtered by a three-pole low-pass filter, such as filter 8, and the result is fed to an analog gate, such as a gate 9. Thus, the output of the first channel is gated by analog gate 9, the second channel by gate 10, the third channel by gate 11—and the tenth channel by gate 18. The analog gates serve to feed the analog value from each of the channels to the channel A to D converter 21, which converts each analog signal to a 4-bit number representing logarithmically spaced levels.

Meanwhile, the output of the base band filter 5 is sampled by two pulse trains denoted herein as the $\alpha$-train and the $\beta$-train. The $\alpha$-train is also denoted $4W \times A$, and the $\beta$-train is denoted $4W \times B$, to indicate the binary mathematics performed to obtain each of the trains. This sampling occurs in sample circuit 22, which feeds the sampled analog values to the base band A to D converter 23. In the converter 23, the $\alpha$-train samples are each converted into a 5-bit number representing the instantaneous magnitude of the sample on a logarithmic scale plus a sign bit to represent the sign of the magnitude. Likewise, the $\beta$-train samples are also converted into a 6-bit number.

After each $\alpha$-train and $\beta$-train sample is converted to a 6-bit number, the number is fed into six-bit section 24 of the 16-bit register 25. The $\alpha$-train number is fed to register 25 by six AND gates 26, each of which feeds a different bit in the $\alpha$ number to the register, under control of pulses denoted $\overline{4W} \times A$. These pulses define the interval following each of the $\alpha$ train pulses before the occurrence of the next $\beta$ train pulse. Likewise, after each $\beta$ train pulse, the 6-bit $\beta$ number from converter 23 is fed to 6-bit section 26 of the register 25 via six AND gates 27 under control of pulses denoted $\overline{4W} \times B$, which define intervals immediately following each of the $\beta$ train pulses. These $\alpha$ and $\beta$ train pulses are shown in FIG. 4 and are produced by the clock shown in block diagram form in FIG. 2. The control pulses, which control the banks of gate 26 and 27 are also shown in FIG. 4 and are produced by the clock. As can be seen, the rate of the pulses in the $\alpha$ train and the $\beta$ train is W, which is ¼ the clock rate denoted 4W. For purposes of example, in this embodiment the rate W is 600-p.p.s. and so the sampling rates are 600 per second and the word transmission rate from the 16-bit register 25 is preferably 600 per second.

Meanwhile, the outputs from the ten channels 4 are sequentially gated by gating signals denoted $n_1, n_2 \ldots n_{10}$, which control the analog gates 9 to 18, respectively. Accordingly, these analog gates sequentially feed analog values from each of the channels to the A to D converter 21, which sequentially converts each analog value to a 4-bit number representing the magnitude of the analog: Thus, sequentially, the converter 21 produces a 4-bit number representing sequential quantization of the analog signals in the outputs of the ten channels. The rate at which sequential numbers from any given one of the channels appears in the output of the converter 21 is equal to $\frac{1}{11}$ of the rate of the $\alpha$ or $\beta$ trains of pulses. In the present example, this rate is 600/11 per second. The factor $\frac{1}{11}$ accommodates the ten channels plus a synchronizing number or word.

The sequential 4-bit numbers appearing in the output of converter 21 are gated into the 4-bit section 28 of register 25 by 4 AND gates 29, controlled by the pulses denoted $\overline{4W} \times A$. At the end of the sequence of sampling the bank of channels, a sync signal is inserted in the 4-bit section 28 of register 25. This sync signal consists of, for example, the binary word 111 and is controlled by the pulses denoted $(4W \times A) \div 11$, shown in FIG. 5. These pulses are inserted in each of the lines feeding the 4-bit section 28 via, for example, the bank of diodes 30 in the sync insert circuit 31. The sync signal serves to indicate that a cycle of sampling of the 10 channels has been completed and is about to commence again and enables a determination at the receiver location of commencement of the cycle of sampling of the outputs from the bank of channels 4. Since the order of sampling of the bank of channels is known and fixed by the gating signals $n_1$ to $n_{10}$, it is only necessary that the initiation of the cycle be detected at the receiver location to make use of the transmitted information.

The 16-bit register 25 is cleared by the $\alpha$ pulse train, also denoted $4W \times A$ and it is read out into a transmitter 32 by pulses denoted $4W \times D$ shown in FIG. 4. Thus, the read-out occurs 600 times per second, producing each time two 6-bit numbers, indicating the instantaneous magnitude of the base band frequencies and indicating each time the magnitude of the channel bands. Eleven such read-outs complete a cycle of the transmitter system producing one 4-bit quantization for each of the channel bands and twenty-two 6-bit quantizations for the base band.

Transmitter 32 energizes an antenna 33 which transmits this information in suitable form as binary words to the receiver location.

FIGURE 2 is a block diagram of the clock which produces the various clock or control pulses mentioned above for controlling the circuits at the transmitter location shown in FIG. 1. The same clock system is also employed at the receiver location and is synchronized as necessary with the clock at the transmitter location by the sync signals mentioned above. The clock consists of the 4W c.p.s. oscillator 41, which triggers a 4W pulse-per-second pulse generator 42. This generator produces the pulses denoted 4W shown in FIG. 4, as well as the complement $\overline{4W}$ of these pulses. The $\overline{4W}$ pulses from the generator 42 are fed to a single input bi-stable flip-flop circuit 43 having two output stages denoted $a'$ and $a''$. The output of $a'$ is fed to the input of single input bi-stable flip-flop circuit 44, the stages of which are denoted $b'$ and $b''$. The pulse outputs from stages $a'$ and $a''$, $b'$ and $b''$ are all shown as waveforms in FIG. 4 and are combined performing the designated logic by four AND gates 45 to 48, which produce the pulse trains denoted A, B, C and D respectively. These pulse trains are also shown as waveforms in FIG. 4. The waveforms A to D are then combined in accordance with designated logic with the outputs $\overline{4W}$ and $\overline{4W}$ from the pulse generator 42 employing the six AND gates 49 to 54, which produce the pulse signals denoted $4W\times A$, $\overline{4W}\times A$, $4W\times B$, $\overline{4W}\times B$, $4W\times C$, and $\overline{4W}\times D$ respectively. These last mentioned pulse trains are those employed as described above to control the various circuits at the transmitter location and are shown as waveforms in FIG. 4.

The same pulse trains are also produced at the receiver location by an identical clock system, which is triggered by the sync signals so that it is properly synchronized with the received binary information.

A divide by eleven circuit 55 is also included in the clock for producing the gating signals denoted $n_1$ to $n_{10}$ and for producing the sync control signals noted $$4W\times A\div 11$$

This includes for example, a 0 to 11 counter 56 which is triggered by the $\alpha$ train pulses denoted also as $4W\times A$. Each stage of the counter produces one of the gate control signals $n_1$ to $n_{10}$ and the output from the counter produces the sync pulse signal.

Turning next to FIG. 6, there is shown the block diagram of the various circuits at the receiver location for receiving the transmitted binary information, separating the quantized 6-bit $\alpha$-train and $\beta$-train words and the quantized 4-bit channel band words and converting these quantized words into analog values, then combining the analog values so as to reproduce or reconstruct the speech patterns fed from the microphone into the system at the transmitter location. At the receiver location, an antenna 61 detects the transmitted signals and feeds them to the receiver system 62, which feeds each transmitted 16-bit combination of words to a 16-bit register 63. For this purpose, transmitter 33 at the transmitter location preferably transmits the total contents (16 bits) of the register 25 at one time in an orderly sequence and this total of 16-bits is received and fed from the receiver 62 to register 63 in the same orderly sequence so that the 6-bit $\alpha$-train number, the 6-bit $\beta$-train number and the 4-bit channel-band number are identifiable in the register. Accordingly, the 6-bit $\alpha$-train number is stored in the section 64, the 6-bit $\beta$-train number is stored in section 65, and the 4-bit channel-band number is stored in section 66. This storage is all preferably parallel storage and so all the bits of each number are simultaneously read-out of the register 63, just as they are fed into the register 25 at the transmitter location.

The 4-bit channel-band word from section 66 is fed from the register 63 to digital-to-analog converter 67 via the bank of four AND gates 68 under control of the signals denoted $4W\times B$ obtained from the receiver location clock 69. The receiver location clock 69, as already mentioned, is identical to the transmitter location clock shown in FIG. 2 and produces identical clock signals shown in the waveform diagram of FIGS. 4 and 5. The clock 69 is synchronized with the incoming 16-bit words stored in the register 63 by the sync signals obtained at the end of each transmit cycle from the 4-bit section 66 of the register. For this purpose, the output of the bank of four AND gates 68 is fed to the sync word sensor circuit 71, which detects each occurrence of a 111 word and triggers the clock circuit 69 upon the arrival of this sync word. Thus, the various clock pulses denoted in the output from block 69 are in proper synchronism with the received 16-bit word and the cycle of the received word.

The output of the four AND gates 68 is also fed through the converter 67, which converts each 4-bit number to the equivalent analog value and feeds this analog value to the bank of ten analog gates 72 to 81 which are controlled by the gate control signals denoted $n_1$ to $n_{10}$ respectively. The output of each of these gates 72 to 81 is fed to a different one of the receiver band channels denoted 82 to 91 respectively, wherein each analog signal is combined with a filtered analog of the base band.

The base band is reconstructed by the circuit as shown in FIG. 6. This includes a digital-to-analog converter 93, to which each of the 6-bit numbers from sections 64 and 65 of register 63, which denote quantized values of the $\alpha$- and $\beta$-train samples, respectively, are fed. For this purpose, a bank of six AND gates 94 under control of the pulses denoted $4W\times B$ are fed via OR circuit 95 to the converter 93 and the bank of six AND gates 96 under control of pulses denoted $4W\times C$. Feed the 6-bit number from section 65 of the register, which represents quantized values of $\beta$-train samples of the base band, via the OR circuit 95 to the converter 93.

Figures 3A, 3B, 3C, 3D, 3E:
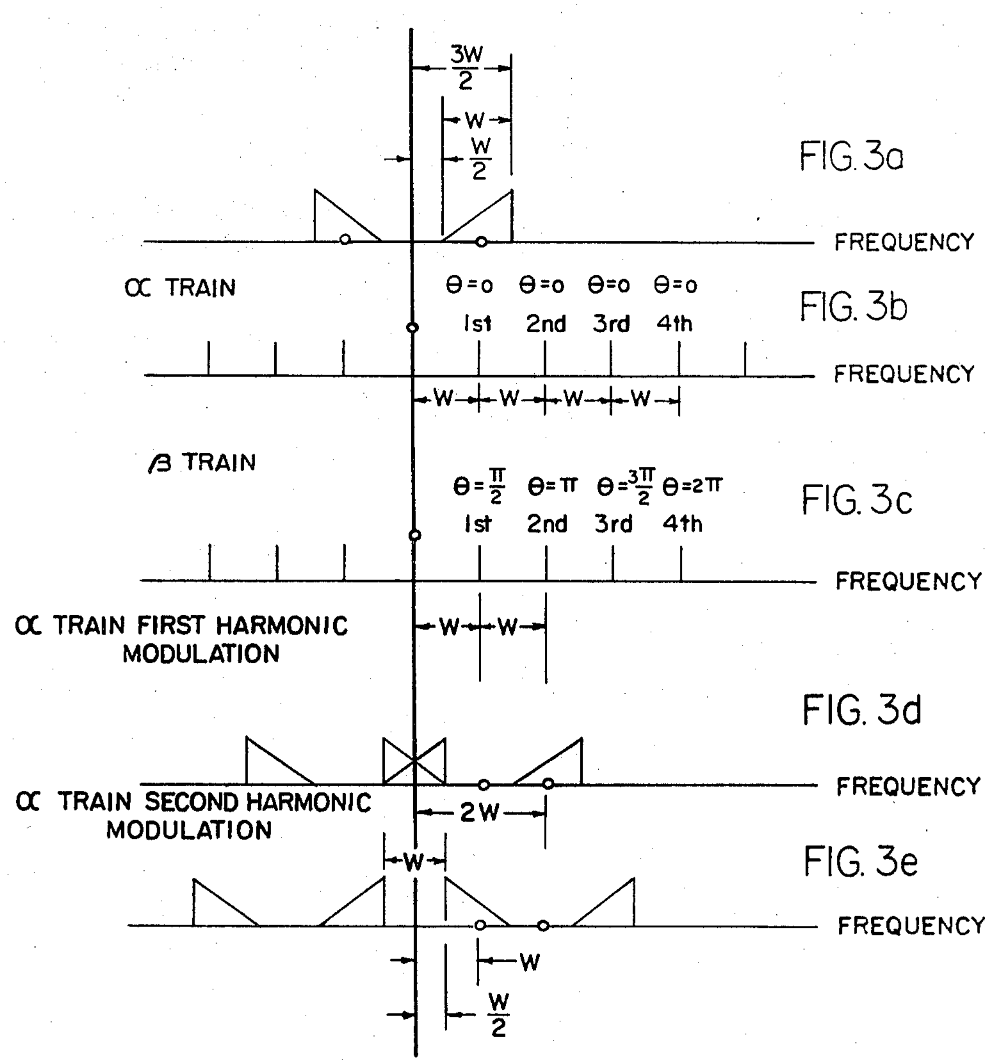

An examination of the spectrum of the output of converter 93 reveals that only the original base band spectrum in the output of the base band filter 5 at the transmitter location is present and that harmonics of all sorts produced by the $\alpha$- and $\beta$-train sampling of the base band from filter 5 are conveniently eliminated. If, for purposes of illustration, the spectrum output from the base band filter 5 is as represented in FIG. 3*a* (W c.p.s. wide and centered at W c.p.s.), then it can be shown that the double sampling by rates ($\alpha$-train and $\beta$-train) in quadrature at rates of W times per second will very conveniently produce the original spectrum uncluttered by sidebands generated in the sampling process. This is demonstrated by the spectrum diagrams in FIGS. 3*a* to 3*e*.

The spectrum diagrams in FIGS. 3*a* to 3*e* illustrate a convenient way for deriving the final spectrum of the sampled waveform. It is derived by first obtaining a frequency representation of the sampling pulses and then computing the modulation products produced when these sampling pulses sample the base band spectrum. For this purpose, FIG. 3*b* shows the spectrum of the $\alpha$-train pulses which are arbitrarily defined as being at zero phase. Hence, each of the harmonics denoted first, second, third, etc. of the $\alpha$-train pulses are all by definition at phase $\theta=0$. FIG. 3*c* shows the spectrum of the $\beta$-train pulses, which also includes 1st, 2nd, 3rd, etc. harmonics. In this case, however, only the zero harmonic along the abscissa is at phase $\theta=0$. The first harmonic is at $\theta=\pi/2$, the 2nd at $\theta=\pi$, the 3rd at $\theta=3\pi/2$, etc. Quite clearly, the modulation for sampling of original base band spectrum, shown in FIG. 3*a*, by the zero frequency component of each of these trains will reproduce the original spectrum at its original spectral location with reference to the zero frequency line. On the other hand, modulations of the original spectrum with the first and second harmonic components produce a spectrum such as illustrated in FIGS. 3*d* and 3*e*, respectively. As can be seen from FIG. 3*d* the first harmonic modulation produces no spectral components in the range $W/2$ to $3W/2$ of the original base band spectrum. Furthermore, it can be shown that for other of the odd-numbered harmonics the same is true, and so all the odd harmonics can be eliminated by merely filtering sharply and excluding all frequencies beyond the original spectrum shown in FIG. 3*a*.

The even harmonics are eliminated in a different way. FIG. 3*e* shows the spectrum of the 2nd harmonic, which includes portions lying in the range $W/2$ to $3W/2$ and these would produce distortion unless they are removed. it will be noticed, by cancellation. For example, the $\alpha$-train 2nd harmonic is at zero phase, while the $\beta$-train 2nd harmonic (which has an identical spectrum) is at $\pi$-phase. Hence, these two harmonics cancel each other as they are in opposite phase. It can also be shown that all other odd harmonics cancel in the same manner. Thus, the band W c.p.s. wide, centered at W c.p.s., and sampled by two trains in quadrature at the rate W c.p.s. very conveniently reproduces the original base band spectrum unaccompanied by distortions contributed by products which normally accompany such a sampling process.

Turning again to the system at the receiver location shown in FIG. 6, it is seen that by merely filtering the output from the converter 93, by the same type of base band filter used in the transmitter, that the original base band spectrum is produced. For this purpose, the output of converter 93 is filtered by base band filter 97 to produce with substantial fidelity the original base band spectrum. The filter 97 is preferably substantially identical to the filter 4 at the transmitter location and so it is 300- to 900-c.p.s. wide having —35 db of attenuation at 300- and 900-c.p.s. and 1¼ db of ripple in the flat portion 320- to 850-c.p.s.

The output of base band filter 97 is equalized, distorted, and spread, and then applied to each of the receiver band-channels 82 to 91 simultaneously. The spectrum is equalized by the audio delay circuit 98, the purpose being to bring the base band spectrum into proper time coincidence with the channel band spectra in the output of the analog gates 72 to 81. The output of the delay 98 is then distorted by the diode distortion circuit 99 to produce an abundance of harmonics extending into the range of the upper channel bands of the speech spectrum. Next, the spectrum is spread by differentiator circuit 100, as necessary to fill out the upper channel bands of speech spectrum. At this point, the base band spectrum is in condition to excite each of the receiver channel bands 82 to 91 and combine in each channel with the corresponding reconstructed analog of the channel spectrum magnitude.

For this purpose, each of the channels 82 to 91 includes a channel-band pass-filter, such as 101 responsive to the output of the differentiator 100. The output of each of these filters is integrated by an integrator circuit such as 102 and then fed to a modulator, such as modulator 103, wherein the filtered base band is modulated by the corresponding reconstructed analog of the channel-band. For example, modulator 103 employs the output of analog gate 72, which is fed to the modulator via holding amplifier 104 and low-pass filter 105, to modulate the portion of the reconstructed, equalized, distorted, and spread base band spectrum, which lies in the band of channel 82, as determined by filter 101. For this purpose, the modulating analog signal from gate 72 must be stored or integrated before application by the modulator. The holding amplifier 104 accomplishes this integration.

The output of the modulator 82 is filtered again by channel filter 106, which may be identical to the channel filter 101, and fed to a summing circuit 107. The outputs of the other channels are similarly fed to the same summing circuit and combined therein with the undistorted base band output from the audio delay 98. Thus, the undistorted reconstructed base band is inserted and combined with the reconstructed analogs of each of the band channels, each of which includes modulated harmonics of the base band frequencies to produce the reconstructed speech. For this purpose, each of the impedances 111 to 120 feed the outputs of channels 82 to 91 to the operational audio summing amplifier 121. Impedance 122 feeds the undistorted base band spectrum to the summing amplifier. The output of the audio summing amplifier 121 consists of the reconstructed speech spectrum, extending over the frequency range 300–3300 c.p.s. and including the pitch frequency, so that the reconstructed speech is not only intelligible, but can be recognized. This output may be fed to audio output device 123, which may be a speaker or means for storing audio signals.

This completes description of an embodiment of present invention of a system for quantizing audio signals such as human speech to produce binary signals representative of the speech, and then reconstructing the speech from the binary signals, to reproduce the speech in reasonably intelligible form. The system includes means for sampling the speech base band spectrum with a pair of pulse trains, so that upon reconstruction of the speech to produce an analog of the quantization thereof, undesirable distortions and harmonics generally produced by sampling are noticeably avoided. This and other features of the invention, however, are made by way of example and are not intended to limit the spirit and scope of the invention, as set forth in the accompanying claims, in which, what is claimed is:

1. A system for sampling a predetermined frequency band of signals to produce samples of the band, which upon recombination substantially reproduce said band comprising, means for producing said frequency band of signals, means for sampling said band of frequencies at a first set of regularly spaced intervals to produce a first sampling of said frequency band, means for sampling said band at a second set of regularly spaced intervals to produce a second set of samplings of said band, said first and second sets of intervals defining rates both of which are equal to said frequency band and said band is centered at a frequency equal to said rate, and means for combining said samplings to produce said frequency band.

2. A system as in claim 1 and in which, said first and second sets of regularly spaced intervals are spaced from each other by an interval equal to the reciprocal of four times said rate.

3. A system as in claim 1 and in which said first set of regularly spaced intervals is defined by a first train of pulses, said second set of regularly spaced intervals is defined by a second train of pulses, and said first and second trains of pulses are in phase quadrature.

4. A system as in claim 3 and in which said frequency band is the base band spectrum of human speech, and further including, means for quantizing said samples producing two sets of binary words representative of said quantized samples, means for transmitting said sets of binary words to a receiver, means for converting said received binary words to analog equivalents, and means for combining said analog equivalents to reconstruct said base band spectrum of human speech.

5. A system as in claim 4 and in which, said means for producing said base band includes a transducer responsive to the human speech, and means responsive to the output of said transducer for filtering the base band of said human speech, and said system further includes, means responsive to the output of said transducer for filtering upper frequency bands of said human speech in a plurality of channels, each extending over a different section of said upper band of human speech, means for sequentially sampling analog values in each of said upper band channels, means for sequentially converting each of said upper band channel samples to binary words representative of the magnitude thereof, means for transmitting said last mentioned binary words along with said binary words representing said base band samples to said receiver, means at said receiver for separating said binary words representing said magnitudes in upper band channels and said binary words representing said base band, means at said receiver for converting said separated binary words to equivalent analog values, and means at said receiver for combining said converted analog values to reconstruct said human speech.

6. A system as in claim 5 and in which, said two sets of binary words representing samples of said base band sampled at said first and second pulse rates are simultaneously transmitted at the same rate as said sampling, and said binary words representing quantized values of said upper band channels are transmitted at the same said rate, said last mentioned binary words being transmitted in a train with successive words in the train being derived from said channels which extend over adjacent sections of the upper band.

7. A system as in claim 6 and in which, the rate of transmission of said binary words representing quantized values from a single one of said upper band channels is a fraction of said pulse rate determined by the number of said upper band channels.

8. A system as in claim 5 and in which, said means for combining at said receiver location includes, a number of receiver channels equal to the number of said channels in which analog values are sequentially sampled, each of said receiver channels including a filter whereby the frequency responses of said receiver channels are substantially the same and correspond to said channels in which analog values are sequentially sampled, means in each of said receiver channels for mixing the output of said receiver channel filter with the corresponding received equivalent analog value of said upper band channel magnitudes, means for energizing each of said channels with said receiver equivalent analog value of said base band, and means for adding the outputs of said receiver channels to said received equivalent analog values of said base band, thereby producing said human speech in reconstructed form.

9. A method for sampling a predetermined frequency band to produce magnitude samples of the band, which upon recombination substantially reproduce said band comprising, producing said frequency band of signals, sampling said band of frequencies at a first set of regular spaced intervals to produce a first sampling of said frequency band, sampling said band a second set of regularly spaced intervals to produce a second set of samplings of said band, said first and second sets of intervals defining rates both of which are equal to said frequency band and said band is centered at a frequency equal to said rate, and combining said samplings to reproduce said frequency band.

10. A method as in claim 9 and in which, said first and second sets of regularly spaced intervals are spaced from each other by an interval equal to the reciprocal of four times said rate.

11. A method as in claim 10 and in which, said first set of regularly spaced intervals is defined by a first train of pulses, said second set of regularly spaced intervals is defined by a second train of pulses, and said first and second trains of pulses are in phase quadrature.

12. A method as in claim 11 and in which, said frequency band is the base band spectrum of human speech, and further including the steps of, quantizing said samples thereof, producing binary words representative of said quantized samples, transmitting said binary words to a receiver, converting said received binary words to analog equivalents, and combining said analog equivalents to reconstruct the human speech frequency band.

13. A method as in claim 12 and further including the steps of filtering the base band of said human speech, filtering upper frequency bands of said human speech in a plurality of channels, each extending over a section of said upper band of said human speech, sequentially sampling analog values of each of said upper band sections, converting said samples of upper band sections to binary words representative of the magnitudes thereof, transmitting said last mentioned binary words along with said binary words representing said base band samples to a receiver, separating said received binary words representing said upper band sections and said received binary words representing said base band, converting said separated binary words representing upper band sections to equivalent analog values of each of said upper band sections, converting said separated binary words representing base band to equivalent analog values, and combining said converted analog values to reconstruct said human speech.

14. A method as in claim 13 and in which said step of combining includes the steps of, mixing said analog of said base band with each of said analogs of said upper band sections and, adding together the products of said mixing along with said converted analog of said base band.

15. A system for encoding speech into binary numbers and transmitting said numbers from one location to a receiver location where said numbers are decoded to produce said human speech comprising, transducer means responsive to said human speech for converting said speech into electrical signals, means responsive to the output of said transducer for filtering the base band of said human speech which contains the fundamental or two adjacent harmonics of the speech pitch, means responsive to the output of said filter for sampling analog values of said base band and converting each sample into a binary base band number representative of the magnitude of said sample, means responsive to the output of said transducer for filtering upper frequency bands of said human speech in a plurality of channels, each extending over a section of the upper frequency band of said speech, means for sequentially sampling analog values from each of said upper band channels, and converting each of said upper band channel samples to binary upper band numbers representative of the magnitude thereof, means for transmitting all of said binary numbers representing said base band samples and said upper band samples to said receiver location, means at said receiver location for separating said binary upper band numbers from said binary base band numbers, means for converting said separated binary numbers to equivalent analog values, means for distorting said converted analog values of said base band numbers, means for filtering upper frequency bands of said distorted base band in a second plurality of channels, each extending over a section of said upper frequency band of said speech, means in each of said second plurality of channels responsive to corresponding upper band number analogs for modulating said filtered, distorted base band, and means for combining the products of said modulation from each of said channels with said converted analog of said base band numbers thereby, producing said human speech.

References Cited

UNITED STATES PATENTS

| | | | |
|---|---|---|---|
| 2,868,882 | 1/1959 | Di Toro | 179—15.55 |
| 3,030,450 | 4/1962 | Schroeder | 179—15.55 |
| 3,046,346 | 7/1962 | Kramer | 179—15 |
| 3,370,128 | 2/1968 | Morita et al. | 179—15 |
| 3,381,093 | 4/1968 | Flanagan | 179—15.55 |

ROBERT L. GRIFFIN, Primary Examiner

W. S. FROMMER, Assistant Examiner

U.S. Cl. X.R.

179—1, 15; 325—38; 332—11